United States Patent [19]

Reeb

[11] Patent Number: 5,893,441

[45] Date of Patent: Apr. 13, 1999

[54] HYDRAULIC FRICTION CLUTCH

[75] Inventor: Wolfgang Reeb, Aichtal-Aich, Germany

[73] Assignee: Behr GmbH & Co., Stuttgart, Germany

[21] Appl. No.: 08/797,333

[22] Filed: Feb. 10, 1997

[30] Foreign Application Priority Data

Feb. 10, 1996 [DE] Germany ............... 196 04 852
May 29, 1996 [DE] Germany ............... 196 21 471

[51] Int. Cl.[6] ........................................ F16D 35/02
[52] U.S. Cl. ................ 192/58.43; 192/58.6; 192/58.61
[58] Field of Search ..................... 192/58.43, 58.5, 192/58.6, 58.63, 58.42, 58.61, 58.62

[56] References Cited

U.S. PATENT DOCUMENTS

| 923,565 | 6/1909 | Newcomb ................... 192/58.5 X |
| 1,238,098 | 8/1917 | Brinton ..................... 192/58.43 |
| 2,015,626 | 9/1935 | Heath ....................... 192/58.6 X |
| 2,714,946 | 8/1955 | Tenot et al. ................. 192/58.42 |
| 3,215,235 | 11/1965 | Kamm . |
| 3,380,565 | 4/1968 | Wilkinson ................... 192/58.5 X |
| 3,739,891 | 6/1973 | La Flame . |
| 3,880,265 | 4/1975 | Elmer . |
| 4,257,501 | 3/1981 | Woods . |
| 4,282,960 | 8/1981 | Glasson et al. . |
| 4,610,341 | 9/1986 | Hauser et al. . |
| 4,682,679 | 7/1987 | Elmer ....................... 192/58.63 X |
| 4,938,331 | 7/1990 | Ohmi et al. . |

FOREIGN PATENT DOCUMENTS

| 46 749 | 10/1986 | Austria . |
| 0 005 927 | 12/1979 | European Pat. Off. . |
| 195 48 065 | 6/1997 | European Pat. Off. . |
| 1 939 402 | 3/1964 | Germany . |
| 1 425 244 | 11/1968 | Germany . |
| 28 04 557 | 8/1979 | Germany . |
| 34 24 385 | 1/1985 | Germany . |
| 1 190 746 | 12/1985 | Germany . |
| 37 14 086 | 11/1988 | Germany . |
| 41 25 396 | 2/1992 | Germany . |
| 41 25 397 | 2/1992 | Germany . |
| 41 28 791 | 3/1992 | Germany . |

OTHER PUBLICATIONS

Patent Abstracts of Japan, JP 4–224319, Pub. date Aug. 1982.

Patent abstracts of Japan, JP 4–185919, Pub. date Jul. 1992.

Primary Examiner—Rodney H. Bonck
Attorney, Agent, or Firm—Foley & Lardner

[57] ABSTRACT

A hydraulic friction clutch has a drive shaft, a drive disk fastened non-rotatably thereto, and an output, which is define by an housing. The housing is rotatably journaled relative to the drive shaft via bearings. The drive disk has a profiling to increase the transmittable torque and rotates in a working chamber formed in a space formed inside the housing. The housing has a supply chamber communicating with the working chamber via a bidirectional duct(s). Working fluid is introduced and drained to and from the working chamber solely through the bidirectional duct(s). Working fluid is introduced and drained from the working chamber substantially from the outer radial region of the working chamber.

21 Claims, 7 Drawing Sheets

HYDRAULIC FRICTION CLUTCH

BACKGROUND OF THE INVENTION

The amount or degree of coupling in a hydraulic friction clutch is typically adjusted by adjusting the amount of working fluid supplied from a supply chamber to a working chamber, which contains a drive disk and the driven component. A hydraulic friction clutch of this type is described in a German patent publication, DE 34 24 385 C2.

The advantage of such a hydraulic friction clutch is that moved valve parts for opening or closing the fluid connection between the working chamber and the supply chamber become superfluous, so that the life of such clutches is longer than in other types of clutches. In the known type, viscose working fluid is circulated to protect the clutch against possible overheating. To circulate, the feed duct for the working fluid is designed so that the fluid connection orifice or port located on the supply chamber side is arranged at a greater radial distance from the clutch's rotation axis than the level of the fluid ring formed in the supply chamber during the rotation of the driven component. By virtue of this design, when the supply chamber is pressurized with a pneumatic medium, it is possible for fluid to overflow from the supply chamber into the working chamber. The return flow to the supply chamber requires a pump, which pumps fluid in a known way through a return duct commencing in the radial outer region of the-working chamber. The chosen design ensures that, when the supply chamber is pressureless, working fluid cannot overflow from the working chamber to the supply chamber through the connecting duct. Working fluid from the working chamber is designed to return solely through the return duct.

Even though such a hydraulic friction clutch has advantages, its inflow and outflow arrangement has disadvantages. For instance, the exact quantity of fluid remaining in the working space is difficult to regulate. The pumping system arranged in the working space conveys a specific quantity per unit time back into the supply chamber as a function of relative rotational speed (the difference between the driving speed and the fan speed being equal to the slip) between the primary disk and the housing, of the viscosity of the working fluid, of the fan speed, and of the fluid quantity present in the working chamber. Thus, a specific state can occur only when the fluid quantity flowing in and out is at an equilibrium. Changes in the boundary conditions, such as changes in the driving speed, fan torque changes or the like, disturb this equilibrium and can delay the established fan speed change. Another disadvantage is that it is difficult to uniformly distribute fluid in the working chamber, upstream and downstream of the drive disk, because fluid first distributes radially outwardly from the inflow.

In this respect, a European patent publication, EP-A 0 005 927, proposes forcing fluid via pressure-loaded pistons into the working gaps of a hydraulic friction clutch having a T-shaped drive disk. A disadvantage of this arrangement is that the displacement pistons loaded with compressed air are located outside the diameter or periphery of the drive disk; this considerably increases the radial dimensions of the clutch, increasing the moment of inertia. Furthermore, controlling the clutch via fluid, whether gaseous or liquid, in this manner has other disadvantages.

There is a need for a hydraulic clutch that can rapidly and simply regulate the degree or amount of flow to and from the working chamber. The present invention meets this need.

SUMMARY OF THE INVENTION

A hydraulic friction clutch according to the invention includes a drive member and a driven member adapted to be rotatably driven by the input. The driven member and the drive member are journaled for relative rotation therebetween. The driven member has an engaging portion adapted to engage the drive member. The clutch includes a working chamber in which the drive member is adapted to rotate and engage the engaging portion of the driven member. The working chamber is adapted to hold working fluid and has at least one bidirectional communication duct for passage of working fluid therethrough. The clutch includes a supply chamber that communicates with the working chamber through the bidirectional communication duct(s) for supplying and draining working fluid to and from working chamber.

The degree or amount of coupling between the drive member and the driven member is controlled by the amount of working fluid in the working chamber. In this respect, the clutch includes a controller for controlling passage of working fluid to and from the working chamber to control the amount or degree of coupling, which can range from a disengagement state to a full engagement state. According to the invention, the bidirectional communication duct is positioned at a radially outermost region of the working chamber through which working fluid communicates.

The driven member can be a housing within which the working chamber and the supply chamber can be housed. The supply chamber can be coaxially or collinearly arranged relative to the working chamber. The clutch can include a plurality of bidirectional communicating ducts for supplying working fluid from the supply chamber to the working chamber and draining working fluid from the working chamber to the supply chamber. The bidirectional communicating ducts can extend substantially radially between the working chamber and the supply chamber. The supply chamber can be radially spaced from the working chamber.

The controller can comprise a pressure cylinder, which is defined by the supply chamber, a piston slideably positioned in the pressure cylinder, and a controllable drive for moving the piston. According to one embodiment, the controllable drive can comprise an expansion element, which can be exposed to an engine coolant or a heat generating source. In another embodiment, the controllable drive can comprise a rotatable cam disk and a tappet actuated by the rotatable cam disk. In yet another embodiment, the controllable drive can comprise an electric motor with a threaded spindle and the piston can have an internal thread engaged with the threaded spindle. In yet another embodiment, the controllable drive can comprise an electromagnet for moving the piston within the supply chamber. In association with the electromagnet, the controllable drive can further include a pivotally mounted lever mechanism operatively connected to the annular piston. The lever mechanism can be moved using the electromagnet to displace the piston.

The pressure cylinder can be annular, radially positioned adjacent to an outer periphery of the working chamber. The piston can be also annular, complementary to the pressure cylinder. The controllable drive preferably includes at least one spring adapted to bias the piston toward the full engagement state. The spring is biased in this manner so that the working chamber becomes filled by default, such as upon turning off the electromagnet or the electromagnet becoming inoperative (e.g., no current to the electromagnet). A portion of the annular piston can form an armature of the electromagnet.

The working chamber and the supply chamber can be separated by a partition. The partition can have a compensating bore that communicates the working chamber with supply chamber in a region of a rotation axis.

The controllable drive can include a rotational speed sensor to regulate the piston displacement based on the detected speed of the housing.

The controller can include an automobile hydraulic pressure source and valves to control supply and drain of working fluid to and from the working chamber to control the amount of coupling between the drive member and the driven member. In this embodiment, the clutch can be used to control a radiator fan drive of an automobile.

Alternatively, the controller can comprise a piston axially displaceable in the supply chamber and an element of expandable material connected to a tappet. The expandable element controls the piston displacement. The expandable element can have an exposed sensing portion fixedly connected to the housing. The expandable element can be fastened to the housing with at least two holders. The piston can have a recess to partially receive the expandable element. The expandable element can be supported between the holders and the tappet abutting the piston. In this respect, the piston can have a trough on an end face that receives the tappet. A partition can be used to divide the supply chamber from the working chamber. A restoring spring can also be positioned between the piston and the partition. The housing can have a bore defining the supply chamber, in which the piston is displaceably received. The piston can have an annular groove seating a sealing ring.

According to the invention, a plurality of bidirectional communicating ducts can be used to supply working fluid from the supply chamber to the working chamber and to drain working fluid from the working chamber to the supply chamber. The working chamber can have a reservoir body at a radial end area of the working chamber. The communication ducts open to the reservoir body.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION OF THE PREFERRED EMBODIMENTS

Figure 1:
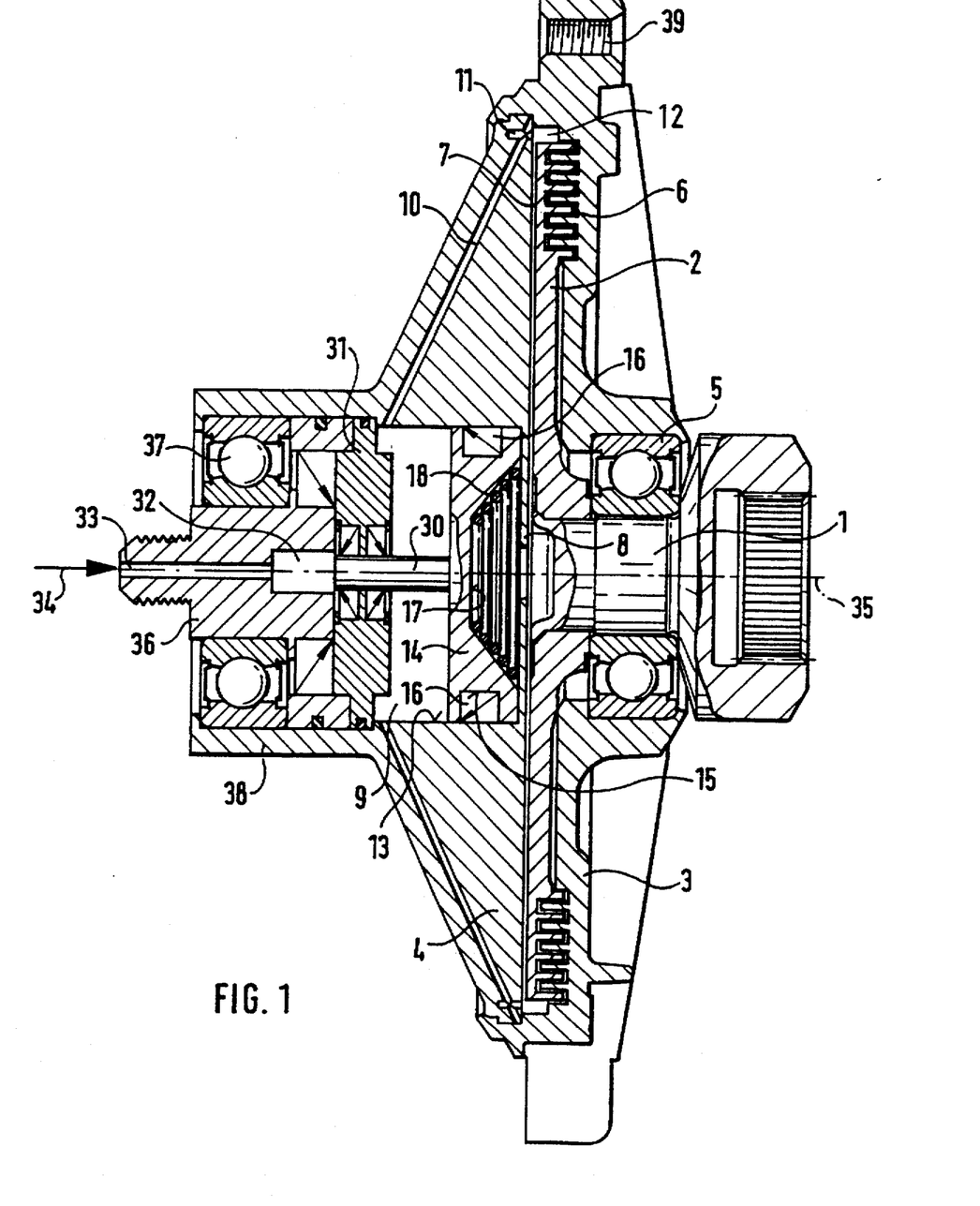
FIG. 1 shows a section through the hydraulic friction clutch according to the invention, illustrating the position in which the working chamber is emptied or drained.
Figure 2:
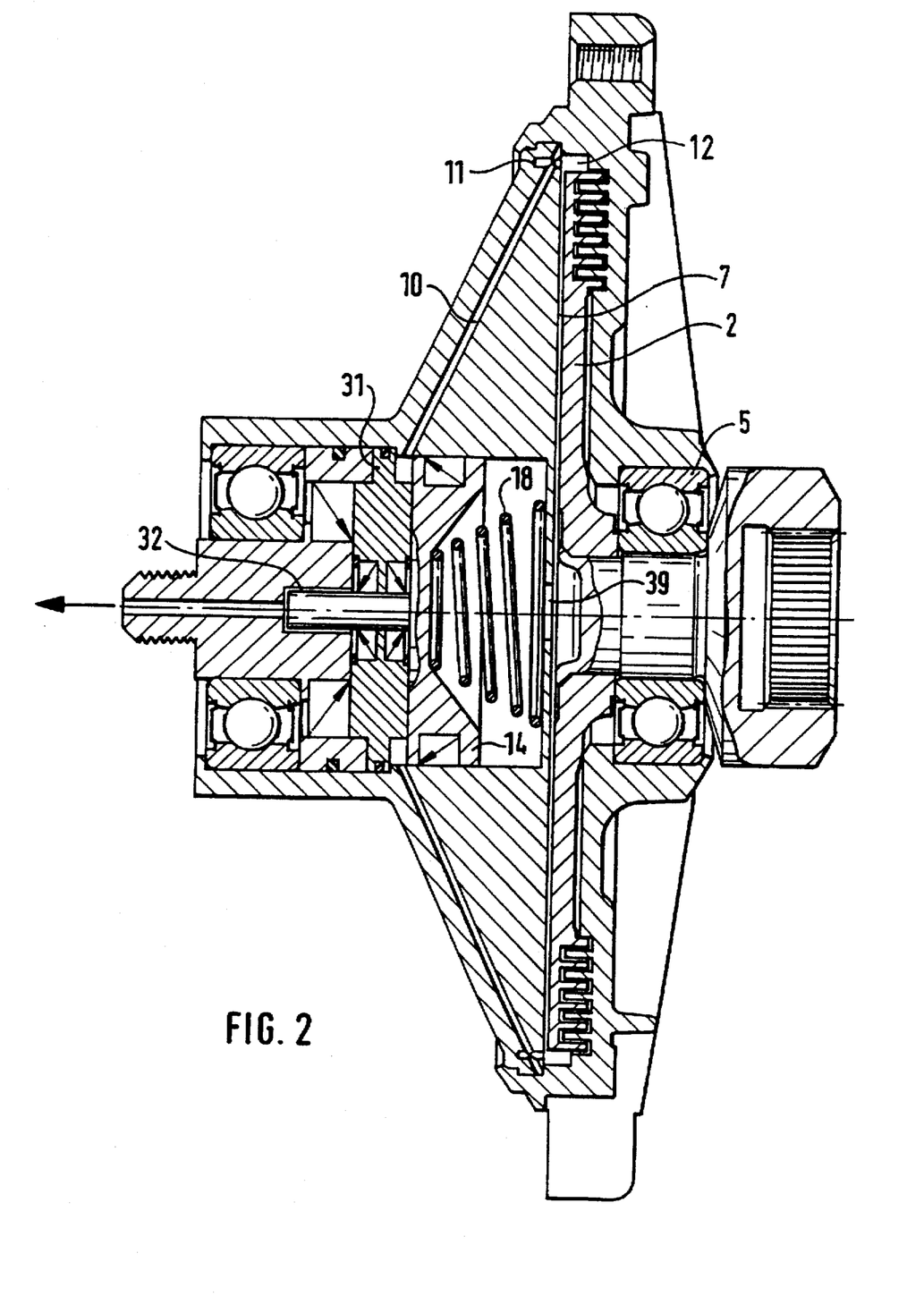
FIG. 2 shows the hydraulic friction clutch of FIG. 1, illustrating the position in which the working chamber is filled.

The same or corresponding elements of various embodiments depicted in the drawings are labeled with the same reference numerals. FIGS. 1 and 2 show a hydraulic friction clutch having a drive shaft (1) and a drive member (2), which is typically a disk, fastened non-rotatably to the drive shaft (1). A driven member (3, 4), which is the output of the clutch, is a housing comprising a basic body (3) and a cover part or cover (4). The two housing parts (3, 4) are-connected non-rotatably together and are rotatably journaled relative to the drive shaft (1) via a hearing (5) (e.g., ball bearings). The drive disk (2) has a profiling (6) to increase the transmittable torque and rotates in a working chamber (7) formed in a space formed between the cover (4) and the body (3). The cover (4) has a supply chamber (9) adjacent the working chamber (7). The working chamber (7) is positioned collinearly adjacent the supply chamber (9) within the housing (3, 4). The cover (4) has a partition (8) that divides and separates the supply chamber (9) from the working chamber (7). The supply chamber (9) is connected to the working chamber (7) via at least one return duct (10, 11), preferably two diametrically opposed return ducts, each having a radially extending duct portion (10) and an axially extending duct portion (11) which is assigned a reservoir body (12) in the radically outer region of the working chamber (7). In this embodiment the working chamber (7) and the supply chamber (9) communicate solely through these return ducts (10, 11). Moreover, the partition (8) is of continuous design and, apart from a compensating orifice (39), which will be describe below, there is no further connecting orifice or communication ducts between the supply chamber (9) and the working chamber (7).

The supply chamber (9) is designed as a cylindrical bore (13) formed in the cover (4). Mounted movably in this bore (13) is a piston (14), which has a radial seal or sealing ring (16) in an annular groove (15) formed on the periphery of the piston. Located between the end face (17) of the piston (14) and the partition (8) is a restoring spring (18), which can be a compression spring having a frustoconical shape. As shown in FIG. 1, in the compressed state, the spring (18) fits into a recess formed in the piston (14). The recess is formed at the end face (17) to achieve a compact design. The piston (14) in turn engages an extension (30) passing through a partition (31), which faces the supply chamber (9) on the side opposite (facing away from) the piston (14). The extension (30) engages two seals or sealing rings (not numbered) formed in the passageway of the partition (31). One side or face of the partition (31) faces a pressure space (32) formed in a central connection block (36). The pressure space (32) can be loaded pneumatically or hydraulically with external pressure in the direction of the arrow (34) via a connecting bore (33) provided in the connection block (36), which is arranged coaxially relative to the rotation axis (35) of the clutch. The connection block (36) is mounted via bearings (37) (e.g., ball bearings), on a collar (38) extending from the cover (4). The two sealing rings provided in the partition (31) seal the extension (30) so that fluid in the pressure space (32) does not escape into the supply chamber (9) and vice-versa.

The clutch housing (3, 4) can be equipped directly in a way known per se with fan blades fastened, for example, to the bores (39).

In operation, referring to FIG. 1, where the clutch is cut off or disengaged, a control pressure sufficiently high to press the piston (14) is applied to the chamber (32) via the bore (33), countering the bias of the spring (18) into the position shown in FIG. 1. In this state, the piston (14) abuts the partition (8) and the entire working fluid is located in the supply chamber (9), disengaging the clutch.

FIG. 2 shows the clutch at the fully engaged state. The control chamber (32) is pressureless and the piston (14) is therefore displaced to the left by the force of the spring (18) until it abuts against the partition (31). In this state, the entire quantity of working fluid initially located in the supply chamber (9) is forced through the connecting ducts (10, 11) into the working chamber (7), filling working fluid radially inwardly from the radial outer periphery of the working chamber. During this filling operation, so that the piston (14) displacing to the left does not generate any vacuum in the space between the partition (8) and the piston (14), the partition (8) can include a bore (39) to compensate the pressure change. Alternatively, the cover can have bores to enable the space in which the spring is positioned to breathe with the atmosphere and prevent vacuum or negative pressure in the space.

It is clear from FIGS. 1 and 2 that, in addition to the two illustrated end positions corresponding to the application of the maximum and minimum control pressures in the chamber (32), it is also possible, depending on the control pressure used, to position the piston (14) between the two extreme positions, corresponding to a different degree or amount of filling of the working chamber (7). In this embodiment, both the inflow of working fluid into the working chamber and the return flow thereof take place solely via the ducts (10, 11). Working fluid therefore is not circulated, as has been done in the past. The new type of control according to the invention has advantages in that working fluid always fills the working chamber (7) from the radial outer peripheral region of the working chamber (7) and that the amount of filling is stable, as a function of the position of the piston (14), which depends on the control pressure applied.

The invention can use various types of controllers for controlling passage of working fluid to and from the working chamber (7) to control the amount of coupling ranging from a disengagement state to a full engagement state of the clutch.

Figure 3:
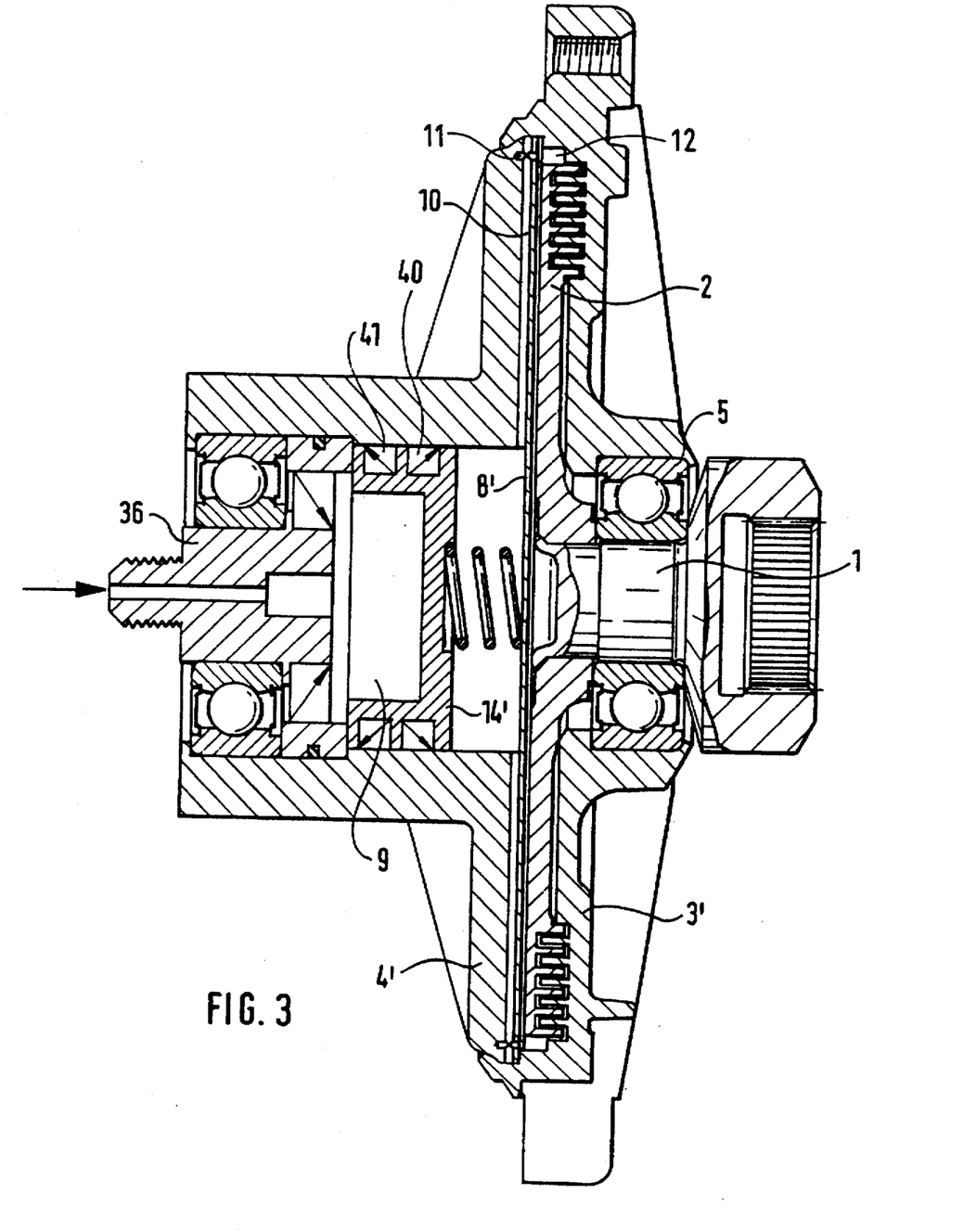
FIG. 3 shows a section through a hydraulic friction clutch of another embodiment according to the invention, which uses a piston movable in the supply chamber, similar to the embodiment of FIGS. 1 and 2.

FIG. 3 shows a variation of FIGS. 1 and 2. In FIG. 3, the connecting ducts (10) run radially parallel to a continuously arranged partition (8') extending substantially the diameter of the drive disk (2). Moreover, the cover (4') has a somewhat different shape. The piston (14') has no extension (30) in this embodiment. The piston has in its outer periphery two sealing rings (40, 41), similar to the sealing rings in the partition (31) of FIG. 1, so that the control medium and working fluid in the supply chamber (9) do not escape or mix. The operating mode deviates from that of FIGS. 1 and 2 in that the clutch is engaged by applying a control pressure, whereas the clutch shown in FIGS. 1 and 2 engages by releasing a control pressure. Accordingly, since the embodiment of FIG. 3 requires a positive pressure application, it is not designed to default to a clutch-engage ("fail-safe") mode.

Figure 4:
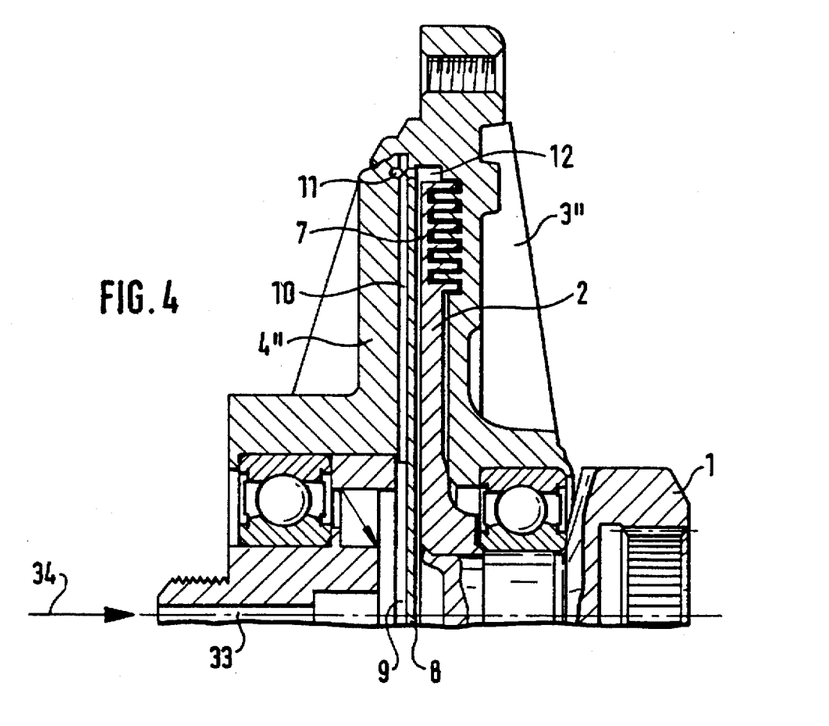
FIG. 4 shows a sectional representation of one-half of the clutch of another embodiment according to the invention, which omits a movable piston in the supply chamber.

The embodiment according to FIG. 4 has dispensed with or omitted the piston entirely. In this embodiment, working fluid is guided through the bore (33) to directly control the clutch engagement. No pneumatic medium is used to avoid undesirable mix of such a pneumatic medium with working fluid in the supply chamber (9). In this embodiment, when the control pressure increases, working fluid is forced through the ducts (10) in the direction of the arrow (34) and into the working chamber (7) from the radial outer periphery thereof and, when the control pressure decreases, working fluid is conveyed back into the supply chamber (9) using the centrifugal force of the rotating clutch, which are higher than the control pressures exerted via the line (33) at that stage. The embodiment of FIG. 4 presupposes some compensating volume in the device, by means of which the pressure in the line (33) is generated.

Figure 5:
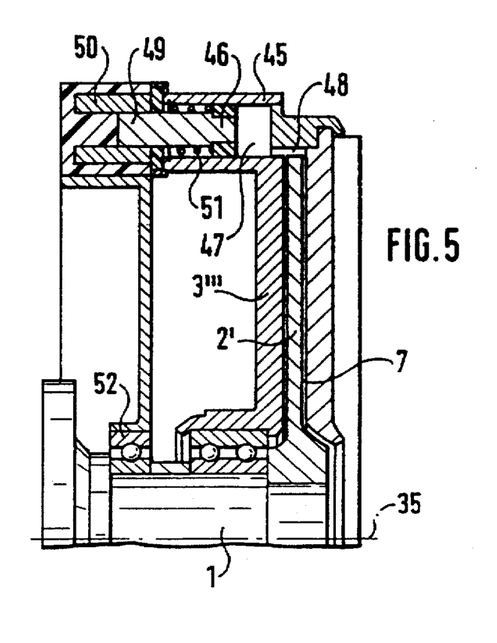
FIG. 5 shows a sectional representation of one-half of a hydraulic friction clutch according to another embodiment of the invention, where the supply chamber is not arranged collinearly, as in the embodiment of FIGS. 1 and 2, but substantially coaxially (radially in the region outside near the working chamber).

FIG. 5 schematically illustrates a modified embodiment of a hydraulic friction clutch according to the invention. Again, the drive disk (2') is non-rotatably connected to a drive shaft (1') and can rotate in a working chamber (7) within a clutch housing (3''') mounted on the drive shaft (1). In this embodiment, the clutch housing (3''') does not have a supply chamber located centrally on the axis of rotation (35), but instead has an annular cylinder (45) formed coaxially around the outer periphery of the housing (3'''), which cylinder forms an annular supply chamber (47). An annular piston (46) is displaceably positioned in the annular supply chamber (47). The supply chamber (47) is connected via a short connecting bore or duct (48) to the radial outermost region of the working chamber (7).

The annular piston (46) possesses an annular extension (49) that acts as an armature of an electromagnet (50), likewise designed in an annular form, which is operated with electrical current. The two annular coil formers of the electromagnet (50) surround the extension (49). A spring arrangement (51) is arranged, preferably fixedly, within the cylinder (45). The spring arrangement (51) presses with its free end against an annular surface of the piston (46) facing away from the supply chamber (47). When the energization of the electromagnet (50) is consequently canceled or reduced, the spring (51) biases the piston (46) to the right, so that working fluid located in the supply chamber or space (47) can enter the working chamber (7) radially from the outside. Conversely, working fluid located in the working chamber (7) is conveyed, by the centrifugal force acting on it, into the supply chamber (47), when its space is increased by the appropriate application of current to the electromagnet (50). This embodiment therefore defaults to a "fail-safe" mode.

As indicated diagrammatically, the annular electromagnet (50) is supported rotatably on the drive shaft (1) via a bearing (53) (e.g., ball bearings). The electromagnet (50) is therefore stationary relative to the rotating part of the clutch, which makes the current application easier.

Figure 6:
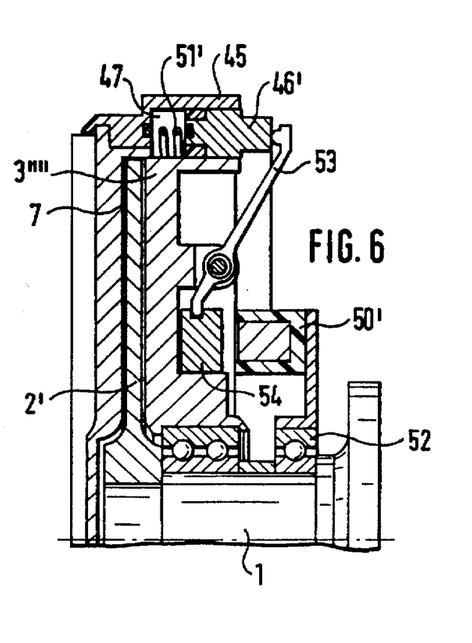
FIG. 6 shows another embodiment of the invention, representing a hydraulic friction clutch of the type shown in FIG. 5, but with a different drive for generating pressure.

FIG. 6 shows a modified embodiment similar to the design according to FIG. 5, in which the annular cylinder (45) forming a fixed integral part of the clutch housing (3"") is likewise arranged coaxially in the region radially outside the working chamber (7). Here, the annular piston (46') is actuated via approximately radially extending, pivotally mounted levers (53) abutting and pressing on one side of the piston (46'), counter to the bias of a spring (51') positioned in the supply chamber (47), which communicates directly with the working chamber (7) via a port or opening (not numbered). Each double-armed lever (53) is connected, at its opposite end facing away from the piston (46'), to a magnetic ring (54). Specifically, the magnetic ring (54), which is formed of a magnetic material, has a groove on its radial outer periphery that engages one end of the lever (53). The magnetic ring (54), which can be moved axially on a sliding surface (55), is located adjacent to an electromagnet (50') mounted rotatably relative to the drive shaft (1). In the position shown in FIG. 5, there is some residual air gap between the ring (54) and the electromagnet (50'). When electrical current is applied to the electromagnet (50'), it pulls the ring (54) toward the electromagnet (50'), pulling one end of the lever (53), which pivots the lever (53) and pushes the opposite end thereof against the piston (46') inwardly. This displaces the piston (46') into its left-hand end position to engage the clutch, which drains working fluid from the working chamber (7) into the supply chamber (47). This embodiment therefore does not default to a "fail-safe" mode.

FIGS. 7 to 15 show various embodiments that can generate pressures necessary to operate the clutches according to the invention. These embodiments can be also used for generating the pressure of a pneumatic or hydraulic control medium employed in the embodiments of FIGS. 1 to 3.

Figure 7:
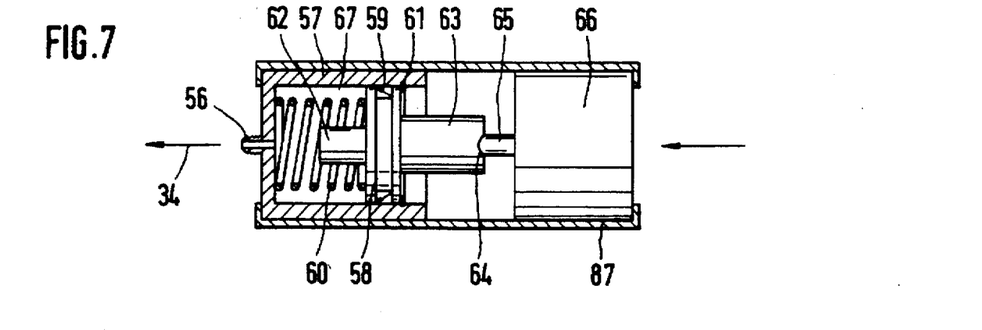
FIG. 7 shows a representation of a first embodiment of a pressure generator that can be used with the hydraulic friction clutch according to the invention.

FIGS. 7 to 10 show designs of pressure drives or generators that can, in each case, be connected via their connecting nipple (56) and via a connecting line (not shown) to the connecting bore (33) of the clutches shown in FIGS. 1–4. Provided as a pressure generator in FIG. 7 is a cylinder (57), in which a piston (58) is mounted displaceably relative to the cylinder (57). The piston (58) has a sealing ring (59) on its outer periphery. A compression spring (60) prestresses the piston (58) in its initial position against a retaining ring (61). The spring force should be sufficient to overcome the piston friction and displace the piston (58) out of the left-hand end position (not shown) into the position shown in FIG. 7. An extension (62) on the piston (58) acts to limit piston displacement. On the side facing away from the spring (60), the piston possesses an extension (63) having a depression (64), into which a tappet (65) of an element (66) of expandable material engages. A coolant is adapted to flow on its right-hand side of the expandable element (66). When the coolant, which preferably comes from the radiator inlet, heats the expandable element (66), it expands according to its characteristic and displaces the extension (63) together with the piston (58) to the left. The volume located in front of the piston in the space (67) is, at the same time, reduced and the control fluid or control gas located in the space (67) is led via the aforementioned connecting line or via a hose (not shown) to the bore (33) in the direction of the arrow (34). It would be also possible to provide the expandable element (66), together with its tappet (65), directly in place of the connection block (36) of FIG. 1, so that the expandable element (66), onto which cooling air then flows, acts directly on the piston (14). The advantage of the embodiment shown in FIG. 7 is that the expandable element (66) can be exposed at any point of the coolant stream and the installation position of the expandable element (66) is not limited to the coaxial position (relative to the clutch). Such an expandable element can also interact with the clutch contemplated in FIGS. 3 and 4. Moreover, in the embodiment of FIG. 7, the cylinder (57), together with the expandable element (66), is arranged in a common cylindrical holding device (87).

Figure 8:
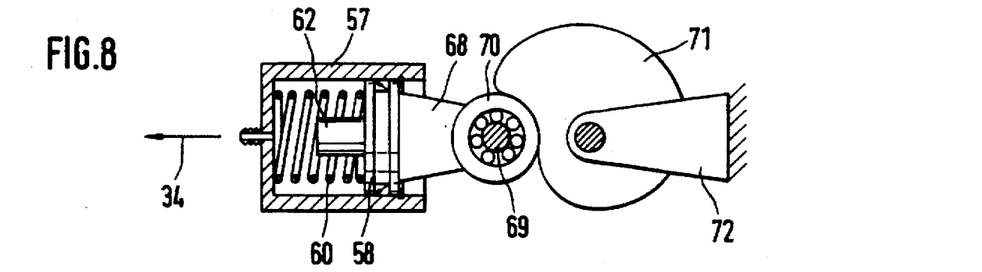
FIG. 8 shows an embodiment of a pressure generator for a hydraulic friction clutch according to the inventions.

The embodiment of FIG. 8 uses a cylinder (57) similar to that of FIG. 7, but the piston (58) has, on its side facing away from the spring (60), a fork (68), which has a rolling bearing or roller (70) rotatably journaled thereto by means of a pin (69). This rolling bearing (70) is operatively connected to a rotatable cam disk (71), which can be rotated, for example, by an electric motor (not shown), rotatably mounted on a fixed holding device (72). Depending on the rotation of the cam disk, the piston (58) can be displaced as a function of the shape of the cam disk. When appropriately derived control signals, for instance from an automobile engine, are applied to the electric motor, the filling of the clutch can be regulated with great sensitivity or accuracy.

If the pressure generator of FIG. 8 is used in a clutch of FIGS. 1 or 2, the drive (motor, cam disk, rolling bearing) will default to a "fail-safe" design. In this case, the compression spring (60) and/or the cam disk is biased to fully return the cam disk to the position shown in FIG. 8 in case of an energy failure.

Figure 16:
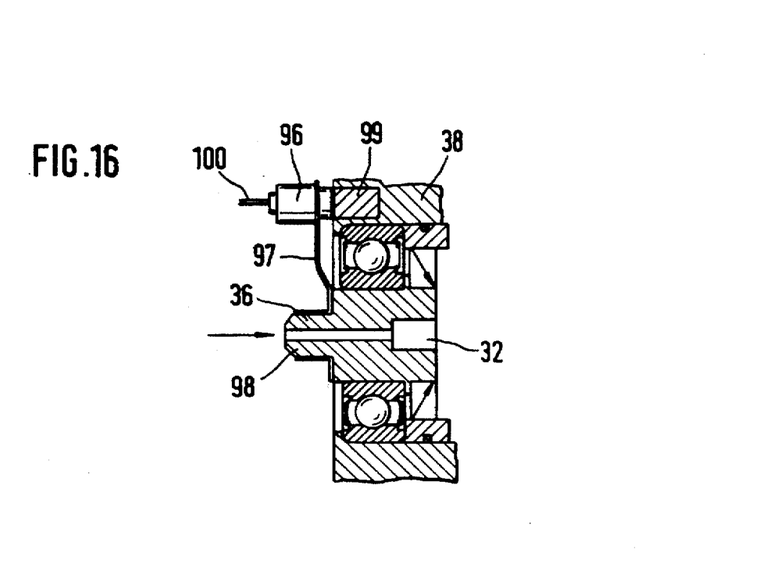
FIG. 16 shows a rotational speed sensor on a clutch according to the invention.

A pulse-width-modulated signal can be applied to the electric motor (not shown) preferably via electronics. For this purpose, the clutch housing can also be assigned a rotational speed sensor that transmits a signal relating to the present rotational speed of the clutch to the electronics. Such a rotational speed sensor is illustrated in FIG. 16.

Figure 9:
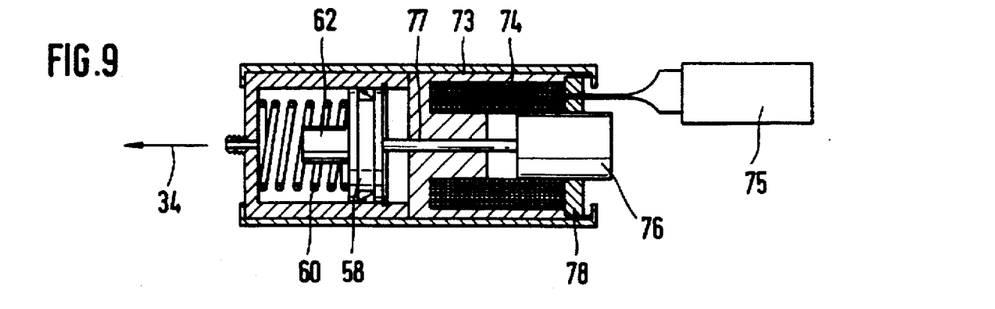
FIG. 9 shows another embodiment of a pressure generator.
Figure 10:
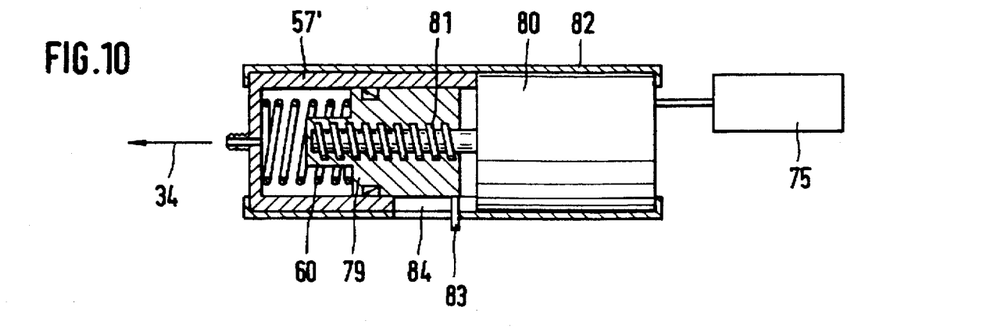
FIG. 10 shows yet another embodiment of a pressure generator.

FIGS. 9 and 10 show electrically driven pressure generators. Again, the piston (58) and the spring (60) are provided in FIG. 9, similarly as shown in FIG. 7 and 8. In FIG. 9, the piston (58) is operatively connected to a solenoid (73) having a coil (74), which is energized by electronics (75). The coil (74) surrounds an armature (76) connected to the piston (58) via a tappet (77) made of non-ferromagnetic material. The magnetic flux generated by the coil (74) is introduced radially into the armature (76) via a flange (78),and closes at the pole face on the left-hand side of the solenoid body (73). Consequently, when current is applied to the coil (74), the armature (76) moves to the left and displaces the piston to the left, counter to the bias of the spring (60 ) so that the pressure medium can be guided to the clutch in the direction of the arrow (34). The electronics (75) can ensure that a pulse-width-modulated signal corresponding to the desired fan speed is applied to the coil (74).

FIG. 10 contemplates, as a drive for the piston (79), an electric motor (80 ) engaging preferably a trapezoidal or threaded spindle (81) into the correspondingly designed piston (79). In this case, the trapezoidal spindle (81) is the output shaft of the motor (80), which shaft is connected via a holding device (82) to the cylinder (57') where the piston (79) can move. The piston (79) is secured against rotation via a shackle (83), which is guided into a slot (84) formed in the cylinder (57'). When the motor (80) rotates in one direction, the piston is displaced to the left and forces the quantity of hydraulic control medium located in the space in front of the piston (79) toward the clutch in the direction of the arrow (34). A pulse-width-modulated signal is also preferably applied to the motor (80) via the electronics (75). In this design, it must be remembered that the drive should not be self-locking so that it can default to a "fail-safe" mode, such as that of the clutch of FIGS. 1 and 2. A multiflight trapezoidal spindle (81) can also be contemplated.

In addition to the possibilities shown for the generation of pressure, it is also possible to utilize a pressure supply (air or oil) already present in the vehicle. In this case, pressure regulating valves or timing valves, which can be appropriately controlled, may be used.

Figure 11:
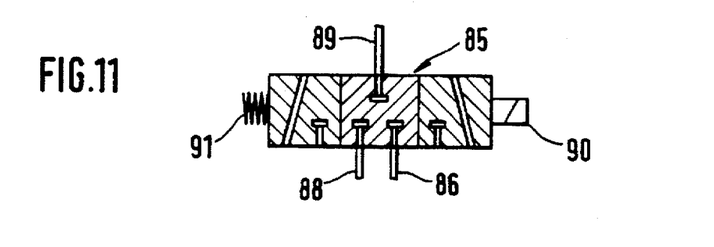
FIG. 11 shows a schematic representation of a 3/3-way valve for controlling working fluid from vehicle's oil or air pressure source, illustrating the position in which the pressure supply is blocked.
Figure 12:
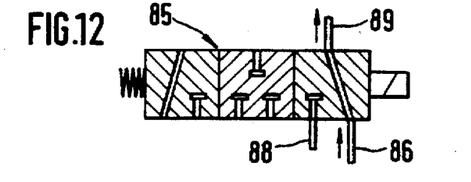
FIG. 12 shows the 3/3-way valve of FIG. 11, but illustrating the position in which the clutch is supplied with fluid pressure.

FIG. 11 shows an embodiment implementing a pressure supply of the aforementioned type. A 3/3-way valve (85) is provided with a connection (86), which is connected to the pressure supply of the vehicle. A further connection (89) leads fluid to the clutch and a connection (88) returns fluid to the pressure supply. In the position shown in FIG. 11, fluid supply to the clutch is blocked. FIG. 12 represents the position of the valve in which the clutch is loaded with a control pressure, which leads via the pressure supply connection (86) to the connection (89). In this case, the respective valve position is reached in a way known per se via an electromagnet (90), which works counter to a restoring spring (91).

Figure 13:
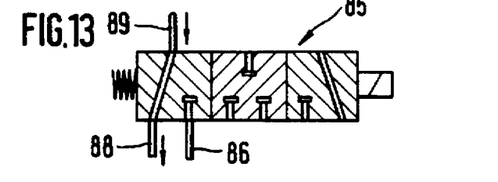
FIG. 13 shows the 3/3-way valve of FIG. 11, but illustrating the position in which the control pressure can escape or drain from the clutch via a return.

FIG. 13 shows the valve position, in which the connection to the clutch, as for example to the connection (33) of FIG. 1, is connected to the return (88) to empty the working space in the clutch. Such a pressure control of FIGS. 11 to 13 can be contemplated, for example, with clutches according to the invention, as shown in FIGS. 1 to 3. The timed loading of the valve (85) makes it possible to adjust and regulate the fan speed via a corresponding control unit.

Figure 14:
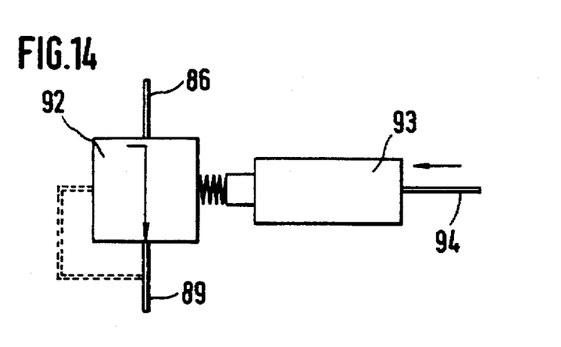
FIG. 14 shows a pressure regulating valve connected to vehicle's pressure supply and controlled via an element of expandable material.

Similarly, FIG. 14 utilizes an existing pressure supply in the vehicle. Here, a pressure regulating valve (92) is used so that the control side thereof is influenced by an element (93) of expandable material exposed to or loaded by a coolant in the direction of the arrow (94). The expandable element (93) can expand, depending on the temperature of the engine coolant fed in the direction of the arrow (94), and consequently also sets a proportional pressure in the clutch, for example that of FIGS. 3 and 4. The pressure brings about a corresponding filling of the working chamber.

Figure 15:
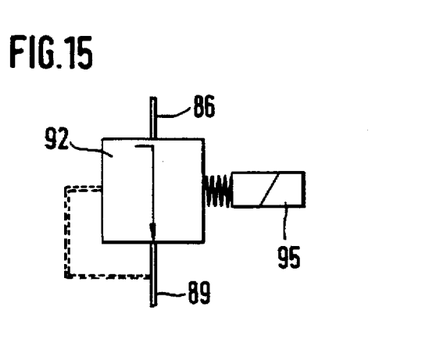
FIG. 15 shows a pressure regulating valve similar to that of FIG. 14, but controlled via an electromagnet.

A configuration similar to that of FIG. 14 is proposed in FIG. 15. The difference is that the pressure regulating valve (92) is influenced on its control side via an electromagnet (95). This design can be used, for example, to control the pressure in clutches shown in FIGS. 1 to 3. In FIGS. 14 and 15, the connection to the pressure supply is again provided with the reference symbol (86) and the connection to the clutch with the reference symbol (89).

In all pressure supply and control devices, it is expedient, for the purpose of refining the control quality, to determine the actual fan speed and regulate the pressure supply as a function of a desired value input. In particular, the fan speed can be regulated in a closed control loop. FIG. 16 shows one embodiment of the rotational speed sensor. The rotational speed sensor (96) is fastened via a pressed-on holder (97) on the connection piece (98) of the aforementioned connection block (36) of FIG. 1. Arranged in the collar (38) of the cover (4), for example, that of FIG. 1, is an element (99), via which the sensor (96) switches or generates its signal. For example, in the case of a Hall sensor, the element (99) is a permanent magnet and in the case of an inductive sensor, the element is a ferromagnetic material. The sensor signal is fed via a cable (100) to a control unit (not shown), which in turn ensures, via the timing of the control valve or by influencing the generation of pressure, that the clutch acquires the rotational speed required by a desired input value.

Figure 17:
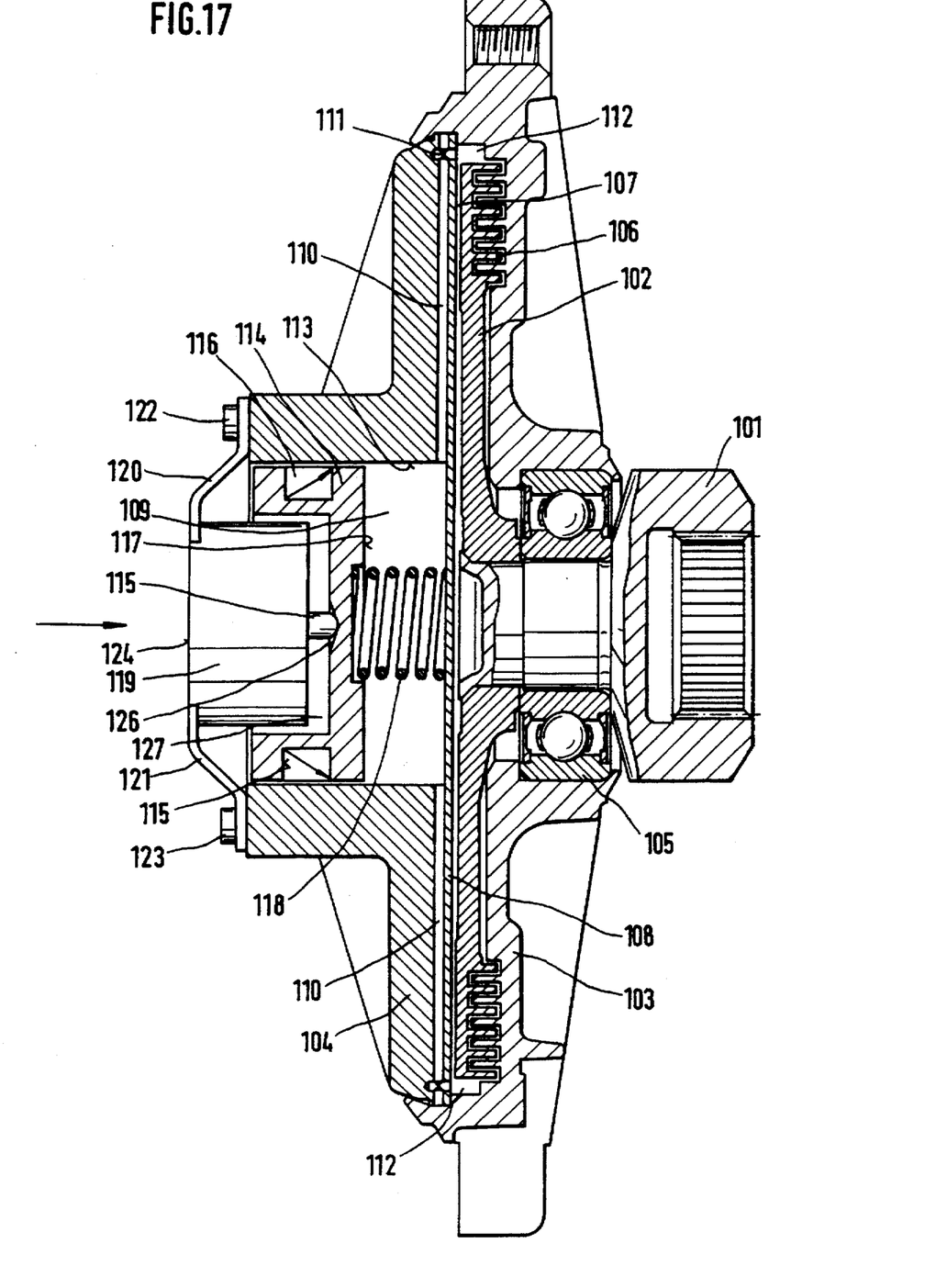
FIG. 17 shows another embodiment of hydraulic friction clutch according to the invention similar to FIGS. 1 and 2, but using an element of expandable material as a pressure generator.

FIG. 17 shows another embodiment of a hydraulic friction clutch according to the invention. The clutch is driven via a drive shaft (101) and a drive member (102), such as a disk, fastened non-rotatably to the drive shaft (101). The output or the driven member of this clutch is a housing comprising a basic body (103) and a cover (104). The two housing parts (103, 104) are connected non-rotatably together and are rotatably journaled relative to the drive shaft (101) via a bearing (105) (e.g., ball bearings). The drive disk (102) has a profiling (106) to increase the transmittable torque and rotates in a working chamber (107) formed in a space formed between the cover (104) and the body (103). The cover (104) has a supply chamber (109) adjacent the working chamber (107). The cover (104) has a partition (108) that divides and separates the supply chamber (109) from the working chamber (107). The supply chamber (109) is connected to the working chamber (107) via two diametrically opposed return ducts, each having a radially extending duct portion (110) and an axially extending duct portion (111), which is assigned a reservoir body (112) in the radially outer region of the working chamber (107). In this embodiment, similar to the embodiment of FIGS. 1 and 2, the working chamber (107) and the supply chamber (109) communicate with each other solely through the return ducts (110, 111). The partition (108) is of continuous design and does not have a valve orifice, similar to the partition (8') of FIG. 3.

In the embodiment of FIG. 17, a cup-shaped axially movable piston (114) is located in a cylindrical bore (113) formed through the cover (104). The piston (114) has an annular groove (115) formed around its outer periphery for receiving a radial seal or sealing ring (116). A restoring spring (118) designed as a compression spring is located between the piston (114) and the partition (108). The end face (117) of the piston facing the partition (108) has a recess to seat or retain one end of the spring (118). Arranged in the region of the front side of the cover (104) is an element (119) of expandable material, which is connected to the end face of the cover part (104) via at least two holders (120, 121) using, for example, screws (122, 123), so that the holders (120, 121) form an abutment for the expandable element (119). The expandable element (119) is designed as a wax element known per se and, in its outer region located on the front side, has a sensing portion (124) that can be expose to flowing air or fluid. In its inwardly directed region, a tappet (125) is supported in a trough-shaped depression 126 formed opposite the recess supporting the spring (118). The expandable element (119) projects with part of its housing into a recess or chamber (127) formed in the piston (114) so that a space-saving, axially compact design is obtained.

In operation, the supply chamber (109) is designed as a pressure chamber, which is filled with a viscose medium, for example commercially available silicone oil. The pressure chamber communicates with the working chamber (107) via the ducts (110, 111). Air, represented by an arrow, which can emerge from a radiator (not shown) for example, flows to the element's sensing portion (124). Air thus heats or cools, depending on the temperature, the wax located in the expandable element (119). The expansion or contraction resulting from the temperature variation moves the tappet (125) outwardly and inwardly. Moving the tappet (125) inwardly moves the piston (114) within the bore (113) to the right, counter to the force of the restoring spring (118). The inward movement of the tappet reduces the volume of the supply chamber (109) to force oil or working fluid out therefrom into the working chamber (107) via the ducts (110, 111). Depending on the filling amount of the working chamber (107), torque is then transmitted from the drive disk (102) to the housing (103, 104). This engages the clutch and drives a fan attached thereto (not shown) for conveying cooling air. The stroke of the tappet (125) and the displacement of volume from the supply chamber (109) are designed so that the increase in transmittable torque or in fan speed corresponds to the required cooling capacities of the radiator. When this cooling capacity is no longer required, the temperature of the coolant in the radiator, and consequently that of the air flowing through the radiator, drops, thus cooling the expandable element (119), which in turn moves the tappet (125), with the aid of the restoring spring (118), outwardly to the left. This increases the volume of the supply chamber (109) allowing working fluid to flow into the supply chamber (109) from the working chamber (107) via the reservoir bodies (112) and the ducts (110, 111). This empties or drains the working chamber (107) and disengages the clutch. The ducts (110, 111) therefore are bidirectional, which function both as inflow ducts and as return ducts.

Accordingly, the aforedescribed hydraulic friction clutches according to the invention advantageously can rapidly and simply regulate the flow amount of working fluid between the working chamber and the supply chamber, and thus accurately control the clutch.

The present invention contemplates regulating the flow to control the clutch without circulating working fluid. According to the invention, one or more bidirectional fluid communication ducts are used to communicate working fluid between the working chamber and the supply chamber. That is, it is no longer necessary to provide one set of ports or ducts for inflow to the working chamber and another set of ports or ducts for outflow to the supply chamber. More specifically, a plurality of bidirectional communicating ducts supply working fluid from the supply chamber to the working chamber and drain working fluid from the working chamber to the supply chamber. In one embodiment, the bidirectional communicating ducts extend substantially radially between the working chamber and the supply chamber. The bidirectional ducts communicate with the working chamber so that working fluid is introduced thereinto and expelled therefrom from the radially outermost region of the working chamber. The supply chamber can be arranged collinearly or coaxially relative to the working chamber. By virtue of this construction, reducing the supply chamber volume introduces working fluid into the working chamber radially inwardly from the outermost radial location so that there is no risk that any air present in the working chamber will be entrained as a result of the rotation of the clutch. The emptying of the working chamber also, again, takes place radially outwardly from the same outermost radial location so that the degree of filling in the clutch depends solely on the pressure level in the supply chamber. This measure makes it possible to effect rapid inflow and outflow to achieve a stable filling state. At the same time, however, a collinear or coaxial supply chamber makes the construction relatively simple.

The connecting ducts between the working chamber and supply chamber can run approximately radially outwardly if desired. At the same time, the pressure in the supply chamber can be generated directly by loading the latter with viscose fluid serving as working fluid so that there is no need for a control for generating pneumatic pressure.

The supply chamber can be also arranged coaxially as an annular chamber radially outside the working chamber, dispensing the known pumping systems for the working chamber. The cutoff dynamics can also be improved since working fluid runs back directly and immediately outwardly into the supply chamber by the influence of centrifugal force.

The piston displaceable in the supply chamber, whether positioned coaxially or collinearly as described, can be moved by a controllable drive to generate pressure. An expansion element loaded by the coolant can serve as a drive in this case. A tappet actuated by a rotatable cam disk may be provided, or, as a drive, an electric motor, the output shaft of which is designed as a threaded spindle to engage an internal thread of the piston. An electromagnet may also be provided as a drive, the electromagnet being capable of being controlled as a function of engine parameters in the same way as the other drives are controlled.

Finally, it is also possible to utilize the vehicle's fluid supply and control the clutch with control valves or pressure regulating valves. In such an instance, the fan speed can be regulated in a closed control loop by providing a rotational speed sensor and a respective control unit.

The supply chamber can be formed by an annular cylinder arranged to adjoin the outer circumference of the working chamber. An annular piston movable in a controlled manner may be provided in the supply chamber. It has proved particularly expedient, in this case, to move the piston by an electric drive, especially an electromagnet. At the same time, the piston can be advantageously capable of defaulting, such as by spring force, into a position that would fill the working chamber and engage the clutch when no active or positive force is applied. This; type of design is "fail-safe", because, if the drive system for the piston fails, the working chamber of the clutch will remain engaged. In the "fail-safe" type, a positive or active force, such as from the force of the electromagnet, is needed to drain the working chamber and disengage the clutch.

Part of the piston can form the armature for the electromagnet. The piston can also be loaded by a lever mechanism which, in turn, can be actuated via an electromagnet.

A pressure-compensating bore can be provided in the working chamber in the region of the axis of rotation to avoid the formation of excess pressure in the working chamber.

Moreover, there may be arranged in the centrally located supply chamber an axially movable piston that seals off working fluid relative to the outside. The piston can be moved by a stroke controlled via a tappet of an element of expandable material. The feeler part or sensing portion of the expandable element can be arranged on the front side of the clutch.

The present invention is particularly suitable or adaptable for controlling an automobile fan for cooling a radiator.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

The disclosures of the German priority applications 19604852.4, filed Feb. 10, 1996, and 19621471.8, filed May 29, 1996, in their entirety, including the drawings, claims, and the specification thereof, are incorporated herein by reference.

I claim:

1. A hydraulic friction clutch comprising:

a drive member;

a driven member adapted to be rotatably driven by an input, the driven member having an engaging portion adapted to engage the drive member, the driven member and the drive member being journaled for relative rotation therebetween;

a working chamber in which the drive member is adapted to rotate and engage the engaging portion of the driven member, the working chamber being adapted to hold working fluid and having at least one bidirectional communication duct for passage of the working fluid therethrough;

a supply chamber radially spaced from the working chamber and communicating with the working chamber through the bidirectional communication duct for supplying and draining the working fluid to and from the working chamber, wherein an amount of coupling between the drive member and the driven member is controlled by an amount of the working fluid in the working chamber; and a controller for controlling passage of the working fluid to and from the working chamber to control the amount of coupling between the driven member and the drive member, wherein the bidirectional communication duct extends substantially radially between the working chamber and the supply chamber and extends to a radially outermost region of the working chamber.

2. A hydraulic friction clutch according to claim 1, wherein the driven member is a housing, the working chamber and the supply chamber being arranged inside the housing, wherein the supply chamber is collinearly arranged relative to the working chamber.

3. A hydraulic friction clutch according to claim 2, further comprising a plurality of bidirectional communicating ducts for supplying the working fluid from the supply chamber to the working chamber and draining the working fluid from the working chamber to the supply chamber.

4. A hydraulic friction clutch according to claim 1, wherein the controller comprises a pressure cylinder, which is defined by the supply chamber, a piston slideably positioned in the pressure cylinder, and a controllable drive for moving the piston.

5. A hydraulic friction clutch according to claim 4, wherein the controllable drive comprises an expansion element adapted to be exposed to an engine coolant.

6. A hydraulic friction clutch according to claim 4, wherein the controllable drive comprises a rotatable cam disk and a tappet actuated by the rotatable cam disk.

7. A hydraulic friction clutch according to claim 4, wherein the controllable drive includes an electric motor with a threaded spindle and the piston having an internal thread engaged with the threaded spindle.

8. A hydraulic friction clutch according to claim 4, wherein the controllable drive includes an electromagnet for moving the piston within the supply chamber.

9. A hydraulic friction clutch according to claim 4, wherein the controllable drive includes a rotational speed sensor to regulate the piston displacement based on the detected speed of the housing.

10. A hydraulic friction clutch according to claim 2, further comprising a partition dividing and separating the working chamber from the supply chamber, the partition having a compensating bore that communicates the working chamber with the supply chamber in a region of a rotation axis.

11. A hydraulic friction clutch according to claim 10, further including a restoring spring positioned between the piston and the partition.

12. A hydraulic friction clutch according to claim 11, wherein the housing has a bore defining the supply chamber, in which the piston is displaceably received, the piston having an annular groove seating a sealing ring.

13. A hydraulic friction clutch according to claim 12, further comprising a plurality of bidirectional communicating ducts for supplying working fluid from the supply chamber to the working chamber and draining the working fluid from the working chamber to the supply chamber, wherein the working chamber has a reservoir body at a radial end area of the working chamber, the communication ducts opening to the reservoir body.

14. A hydraulic friction clutch according to claim 1, wherein the controller includes an automobile hydraulic pressure source and valves to control supply and drain of the working fluid from the working chamber to control the amount of coupling between the drive member and the driven member, the clutch being adapted to control a radiator fan drive of an automobile.

15. A hydraulic friction clutch according to claim 2, wherein the controller comprises a piston axially displaceable in the supply chamber and an element of expandable material connected to a tappet, the expandable element controlling the piston displacement.

16. A hydraulic friction clutch according to claim 15, wherein the expandable element has an exposed sensing portion and is fixedly connected to the housing.

17. A hydraulic friction clutch according to claim 16, wherein the expandable element is fastened to the housing with at least two holders.

18. A hydraulic friction clutch according to claim 17, wherein the expandable element is supported between the holders and the tappet abutting the piston.

19. A hydraulic friction clutch according to claim 18, wherein the piston includes a trough on an end face that receives the tappet.

20. A hydraulic friction clutch according to claim 19, further including a partition dividing the supply chamber from the working chamber.

21. A hydraulic friction clutch according to claim 15, wherein the piston has a recess that partially receives the expandable element.

* * * * *

UNITED STATES PATENT AND TRADEMARK OFFICE
CERTIFICATE OF CORRECTION

PATENT NO. : 5,893,441
DATED : April 13, 1999
INVENTOR(S) : Wolfgang Reeb

It is certified that error appears in the above-identified patent and that said Letters Patent is hereby corrected as shown below:

<u>Column 13,</u>
Line 15, insert -- the engaging portion of -- after "radially spaced from".

Signed and Sealed this

Fourteenth Day of May, 2002

Attest:

JAMES E. ROGAN
Attesting Officer     Director of the United States Patent and Trademark Office